May 9, 1939. A. CROSSLEY ET AL Re. 21,074

HIGH-FREQUENCY INDUCTANCE

Original Filed April 9, 1934

INVENTORS,
ALFRED CROSSLEY,
CHARLES C. NEIGHBORS
BY
Pennie, Davis, Marvin & Edmonds.
ATTORNEYS Reissued May 9, 1939

Re. 21,074

UNITED STATES PATENT OFFICE 21,074

HIGH-FREQUENCY INDUCTANCE

Alfred Crossley and Charles C. Neighbors, Chicago, Ill., assignors to Johnson Laboratories, Inc., Chicago, Ill., a corporation of Illinois Original No. 1,978,568, dated October 30, 1934, Serial No. 719,737, April 9, 1934. Application for reissue October 20, 1936, Serial No. 106,584

3 Claims. (Cl. 175—356)

The present invention relates to inductances intended for use in high-frequency circuits and more particularly to that class of high-frequency inductances in which it is essential to reduce the dissipative energy losses to the lowest possible value. Inductances of this class, for example, are essential in high-frequency measuring apparatus, and are used extensively in wireless, radio and carrier signalling systems.

The invention herein disclosed has particular applicability in those cases in which the current flowing through the inductance is not of such magnitude as to determine the size of the conductor necessary to avoid excessive heating of the inductance device.

It is a principal object of the present invention to provide a form of high-frequency inductance having a considerably greater ratio of desired inductance to undesired dissipative losses than any form of high-frequency inductance at present or heretofore employed. Further objects of the present invention are to provide a form of inductance inexpensive to construct, whose components are capable of manufacture on automatic machines, and which will have negligible or readily compensated variations in its parameters when produced in quantities.

As will be apparent from what is to follow, these and other desirable objects are attained in the present invention by employing an entirely new component in the construction of such inductances. This new component completely modifies the conditions which determine the most desirable dimensions of the coil itself, enables forms of winding to be used which heretofore have been considered undesirable, and results in an inductance entirely novel in its performance capabilities and in its adaptability to apparatus in which such components are employed.

The range of frequencies commercially utilized in wireless and radio, and in carrier-frequency communication, and for which the new high-frequency inductance is adaptable, may be taken as extending from approximately 30,000 cycles per second to 3,000,000 cycles per second. For the purposes of this specification, the range of frequencies from 30,000 to 100,000 cycles per second may be taken as the low high-frequency range, the range from 100,000 to 500,000 may be taken as the medium high-frequency range and the range from 500,000 to 3,000,000 may be taken as the upper high-frequency range, each of these ranges being taken as having reasonable overlap each into the next.

Our new improved high-frequency inductance is capable of application under a wide variety of conditions as to each of the principal electrical dimensions of the inductance itself, and as to the range of frequencies over which it may be advantageously employed. For any particular set of conditions, it will be found that our invention provides a method of determining all the physical dimensions and thus the complete design for an inductance having the best operating characteristics that it has thus far been possible to attain. In each case, the inductance designed in accordance with the teaching of the present specification will have more desirable operating characteristics at any particular frequency, and, additionally, a new behavior of its characteristics, as the frequency is varied over a considerable range, differing essentially from that attained in any earlier form of inductance device.

In many cases it is desirable to enclose high-frequency inductances or the devices in which they are used, in metallic shields, in order to prevent other components of the apparatus from affecting them, and to confine the magnetic and electric fields of the inductance itself. One of the unique characteristics of our improved high-frequency inductance is that it may be enclosed in smaller shields than would be necessary to avoid excessive losses in an inductance of the conventional type, even though the maximum diameter of our improved inductance may be greater than the diameter of the conventional inductance having the same inductance value.

The invention provides a means for determining the ideal dimensions for an inductance for any particular set of design conditions. In general, however, it will be found desirable to depart slightly from these ideal dimensions in order to accommodate the design to the particular conditions of manufacture under which it is to be produced. For example, it may be desirable to employ sizes or types of conductors differing from those which would produce the best results, or to employ dimensions for the windings or for other parts of the design which are accommodated to the particular tool and machine equipment available for their manufacture. It will be understood, therefore, that these departures are within the purview of the present invention.

For a complete understanding of the invention, the following description should be read in connection with the drawing, in which—

Figure 1:
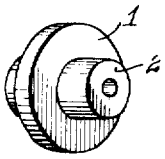
Fig. 1 is a view in perspective of a generalized high-frequency inductance exemplifying the invention.

Referring to Fig. 1, it will be seen that our improved high-frequency inductance consists essentially of two parts, namely, a coil 1 and a core 2. The coil 1 is preferably of the type sometimes designated as a "lattice winding" or "universal winding." Coils of this description are well known in the art and are conveniently wound on machinery especially designed for the purpose. They are particularly characterized by the fact that turns in any one layer do not lie parallel to turns in the layers next above or below. The advantages of this type of winding, as well as additional precautions to be employed in utilizing it, will be more clearly understood from what follows.

Still referring to Fig. 1, the core 2 is an iron core containing individually-insulated and extremely minute magnetic particles, compressed with a suitable binder to a desired apparent permeability. Compressed comminuted magnetic material of this character and processes for producing it have been described in U. S. patents, Nos. 1,940,228, 1,982,689 and 1,982,690 and in corresponding British patents, Nos. 366,475 and 403,-368, and in other patents and publications, both in the United States and Europe.

The invention resides, not in the forms of winding which are used or in the magnetic material employed in the construction of the magnetic cores, but rather in the manner in which the winding and the core cooperate, because of their dimensions and proportions and because of their physical relationship, one to another.

Iron-core inductors were employed in the early days of the art of wireless telegraphy. In general, however, their use was restricted to the low high-frequency range and the iron cores were constructed of laminations. In order to reduce the energy losses in these iron cores, the thickness of the laminations was reduced, in some cases, to as little as 0.001 inch. Since sheets of iron-containing metal thinner than this could not be produced at reasonable expense, and in order to still further reduce the losses, cores of powdered ferrous material were employed. These ferrous powders were either held in a suitable container to form a core body, or they were held together in a solid mass of suitable shape by employing various binding materials. In no case, however, so far as applicants are informed, until the disclosures of the British patents above referred to, were the ferrous particles employed in these cores individually insulated and of the extreme degree of fineness and the high degree of purity of the iron content, which are contemplated in the present invention. The particles in these earlier cores were not individually insulated, or if they were individually insulated, the material used for the insulation was of such a nature as to preclude the attainment of the extremely low order of losses herein contemplated.

Following these early experiments with iron-core inductances, and because they were unsuccessful and further because, even as then constructed, air-core coils were greatly superior to the best that could be secured in iron-core inductances, at least in the medium and upper high-frequency ranges, those who were working in the art of high-frequency signaling more or less completely abandoned any attempt to produce effective iron-core high-frequency inductances, and concentrated their attention upon the development of increasingly efficient air-core inductances.

It was well established as early as 1918, that the most efficient form of air-core inductance for high-frequency purposes was a single-layer solenoid having a ratio of diameter to length of approximately 2.46 and that the best form of conductor for use in winding such a solenoid was one having a number of insulated strands. Further development of these inductances demonstrated that it was advantageous, particularly for the higher frequencies, to wind the turns, not closely together, but with a space between them about equal to the diameter of the wire itself, wherever such a construction was feasible.

Because of the difficulty of adapting a single-layer solenoid having the ideal ratio of diameter to length to the more advanced apparatus, such for example as that now utilized in radio broadcast receivers, the general tendency of design has been away from the ideal proportions, so that modern radio receivers employ single-layer solenoids having a ratio of diameter to length as low as 0.4.

The intermediate-frequency amplifiers of superheterodyne receivers are normally designed to operate at a frequency lying in the range which has been designated as the medium high-frequency range. Because these amplifiers are designed to operate at a fixed frequency, and also because of the very high amplifying capabilities of modern thermionic relays, it is possible to utilize air-core inductances of types having relatively low efficiency, which could not be successfully utilized in the resonant circuits of high-frequency amplifiers intended to be tuned over a band of frequencies in the range which has been designated as the upper high-frequency range. Thus, types of windings, without iron cores, similar in their general aspects to the windings contemplated in the present invention and designated as "lattice windings" or "universal windings" have been employed in these intermediate-frequency amplifiers. This use of coils of this type is not to be confused with the use in our improved high-frequency inductance, of coils of similar character and similarly produced. This is because, as will be apparent, the employment of a ferro-magnetic core completely alters the problems of the design and the physical dimensions of the resulting high-frequency inductance.

Remembering that an inductance is designed to have a particular desired inductance value stated in microhenries or millihenries, it is to be noted that two other electrical dimensions of the device must be contemplated in the design and play a controlling part in determining its utility. These other dimensions are the resistance and the capacity of the device, the capacity being sometimes referred to as the "distributed capacity".

In an air-core inductance, the resistance is determined by a number of factors. The size and construction of the conductor, as well as the material employed, are a first consideration. Copper wire is normally used, but in certain special cases, iron and other wires having higher resistance than copper have been employed. Because of the minute electric currents produced in any one turn of a coil by the magnetic field generated in the same turn and in adjacent turns, high-frequency currents can travel, in general, only on the surface of a conductor. The eddy currents in the wire caused by these magnetic fields, generate counter electro-motive forces which prevent the current from flowing in the center portions of the wire. This materially increases the effective resistance to the conductor, the effect increasing as the frequency increases.

A second consideration is the type of insulation used, not only for surrounding the conductor itself, but also to form the support upon which the coil is wound. Because of the electrostatic field which exists between turns in a coil due to the differences in voltage, there are, in general, dielectric losses in the insulating material. These losses may be minimized by reducing the amount of insulating material necessary to insulate the turns of the coil, and to support it, and by employing insulating materials having low inherent losses.

It will be seen, therefore, that the dissipative losses, and therefore the effective resistance, of an air-core high-frequency inductance can be minimized by so designing the inductance that it will have a minimum length of wire for the given inductance value, and a minimum amount of dielectric material. However, any attempt to improve the efficiency of an air-core coil, by concentrating the turns into a small space so as to get the desired inductance with a relatively small amount of wire, materially increases the dielectric losses, even in spite of the fact that the amount of dielectric material may also have been reduced, because it increases the intensity of the electrostatic field existing between turns of the coil.

In our iron-core inductance, however, due to the effective permeability of the core, the length of wire necessary to produce a desired value of inductance is materially decreased. This operates to decrease the losses in the wire itself, without any increase in the losses in the insulating material because, in general, a smaller amount of it is employed. Against this, however, the iron itself introduces new losses and, therefore, tends to increase the effective resistance of the complete device. The successful employment of an iron core, therefore, requires that it shall be of such a nature that the losses which it introduces are materially less than the losses eliminated by virtue of the smaller amount of wire and insulating material required for the given inductance value.

The high-frequency resistance of the wire, the losses in the insulating material, and the losses in the iron core, all increase with frequency. The losses in the iron core increase somewhat more rapidly with frequency than the losses in the wire and the insulating material. In the lower high-frequency range, the increase in losses due to the presence of the core is very much less than the decrease in losses resulting from the use of a materially smaller amount of wire and insulating material for the same inductance value. In this range, therefore, the iron-core inductance of the present invention has a very much higher efficiency than an air-core inductance having the same inductance value. As the frequency is increased, with corresponding increase in losses, the advantage secured by the use of the iron core gradually diminishes, but throughout the lower, medium, and upper high-frequency ranges, the iron-core high-frequency inductance of the present invention is superior to an air-core inductance having the same inductance value.

As an example of the advantage just described, it may be pointed out that a high-frequency inductance embodying the present invention, when measured at a frequency of 2,000,000 cycles per second, will have 70% greater inductance, but only 26% greater high-frequency resistance than the same winding without the iron core. The reactance to resistance ratio of such an inductance, that is, the "Q" value commonly used by engineers in the high-frequency art, will be of the order of 165 at a frequency of 1,200,000 cycles per second, as against a value of 144 for an air-core inductance constructed in accordance with the most advanced principles of conventional design, at the same frequency. At 600,000 cycles per second, the "Q" of the same iron-core coil has risen to 214, while the "Q" of the air-core coil has fallen to 140. At this frequency the iron-core coil is 53% better.

The distributed capacity of a winding is injurious in two ways. In the first place, the higher the capacity is, the greater will be the loss, reflected in the apparent resistance of the coil, due to dielectric losses in the insulation material which forms the dielectric of the capacity. Moreover, if the distributed capacity is large, it may make it impossible to tune the coil, with an external condenser, to a desired high frequency, The inductance of the coil, together with its distributed capacity, give the coil a fundamental frequency of its own, beyond which it can not be tuned by external means, and this natural frequency may be very troublesome in particular applications.

Since by employing an iron core having suitable loss characteristics, the length of wire in the coil necessary to produce a particular inductance value may be materially decreased, it is possible at the same time to reduce the distributed capacity of the coil, by decreasing the length of the coil. The reduction of the distributed capacity, materially increases the resonant frequency of the coil and also decreases the dielectric losses in the insulating material, which appear as a portion of the effective resistance of the coil.

As has been pointed out, the magnitude of the current which traverses high-frequency inductance devices, herein contemplated, is so small that it does not determine the size of the wire necessary. The coils are therefore wound with a wire which is mechanically convenient and which can be successfully used on universal winding machines. For inductances for use in the low high-frequency range, solid wire may be used, such for example as No. 38 silk enamel. In the medium and upper high-frequency ranges, wire having a plurality of enamel insulated strands, with single silk insulation overall, is to be preferred. Since the size of the wire is not determined by the current, the strands may be of No. 41 B. & S. gauge, which has been found to be mechanically feasible, and satisfactory in use. In the medium high-frequency range, seven such strands may be used, but in the upper high-frequency range it is preferable to use ten such strands. It will be understood that the preferred proportions of the coil are to a slight extent modified if wire of other sizes is used. It is preferable to use a wire having silk insulation over the bundle of strands, since this is found satisfactory for use on the winding machines and gives adequate insulation between the turns with low dielectric loss. The use of some other insulation would also affect, in some slight degree, the ideal dimensions of the coil.

For the lower and medium high-frequency ranges, the wire may be close wound, but in inductances to be used at frequencies in the upper high-frequency range, the winding is preferably arranged to leave a space between the turns substantially equal to the overall diameter of the stranded conductor, for the purpose of reducing the capacity between contiguous portions of a turn. Any greater spacing than this would slightly affect the ideal dimensions and would not materially assist in decreasing the capacity.

So far as the "cross-over" of the winding is concerned, the ideal dimensions for inductances to be used in the medium high-frequency range contemplate that the angular distance in which each convolution of the winding passes from one side of the coil to the other and back again, will be slightly over 360 degrees. In the upper high-frequency range the number of cross-overs in 360 degrees may advantageously be increased to as many as six. Any variation in the cross-overs will also have a slight effect upon the ideal proportions of the winding.

It is preferable to wind the coils directly upon the core, using paper or other suitable insulating material having a thickness of approximately .002 inch, to insulate the first layer from the core. In coils of very large inductance value, it may be desirable to increase the thickness of this insulation on which the coil is wound. In any event, the coil should be mounted upon and concentric with the core, and the length of the insulating tube is preferably only slightly greater than the length of the coil.

Having in mind various factors which affect the design of a high-frequency inductance, as above set forth, it is next necessary to note that the inductance values normally required in high-frequency inductances are, in general, inversely proportional to the frequency at which they are to be employed. For example, at an intermediate frequency of 175,000 cycles it is customary to employ an inductance of approximately 8,000 microhenries with a tuning capacity of about 120 micromicrofarads. At an intermediate frequency of 456,000 cycles, however, the usual inductance value will be of the order of 1,500 microhenries, with a tuning capacity of about 70 micromicrofarads. For use in the broadcast range of frequencies, that is, from 550,000 cycles to 1,500,000 cycles, the usual value of inductance is about 250 microhenries, and it is tuned to the highest frequency in the range with a minimum capacity of approximately 30 micromicrofarads.

It will be understood, therefore, that in stating the proportions which determine the design of our improved high-frequency inductance for any desired inductance value, we have in mind that the inductance values will, in any particular case, be of the order of the values now commonly employed. If, however, it is desired to design an inductance in accordance with this invention, but having an inductance value widely different from the value commonly employed at the intended frequency or frequency-range, it will be found that the proportions to be given will still determine the best design, but that, in general, it will be preferable to choose a size of wire which will give the required inductance value within the design proportions. For example, if a much larger inductance value than is commonly used is to be designed, a conductor having an appropriately smaller external diameter should be chosen, so as to permit winding considerably more turns into approximately the same space, thus maintaining the proportions of the design. On the other hand, if a much smaller inductance value is desired, the external diameter of the conductor, or the number of strands, or the size of the individual strands, or the space between the turns, may be increased, to again maintain the proportions of the design.

Figure 2:
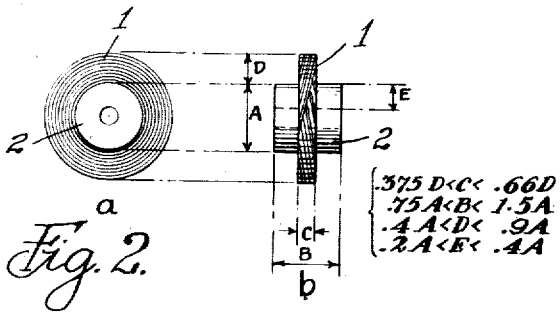
Fig. 2 is a diagrammatic drawing of such a high-frequency inductance, showing two views thereof, indicated as *a* and *b*, respectively.

Because the iron core partakes of the characteristics of both an insulator and a conductor, it is essential to so arrange the design that the turns of the winding are contiguous to the core to the minimum feasible degree. For this purpose, a lattice or universal winding having a ratio of length to radial depth considerably less than unity is advantageous. Referring to Fig. 2, depending on the inductance value and the frequency at which the inductance is to be used, the ideal shape of the winding is given by the expression: $.375D<C<.66D$.

Referring again to Fig. 2, it will be observed that the iron core is centrally located in the hole in the coil and extends slightly to either side. The ideal length for the core may be expressed as follows: $.75A<B<1.5A$. If the length is materially decreased below the lower limit given above, the apparent permeability of the core will diminish and a greater number of turns, representing more wire and greater losses, will be required to produce a given inductance value. If the length of the core is increased materially beyond the maximum given above, there will be only a small possible reduction in the amount of wire for a given inductance value, while the losses due to the core will be disproportionately increased.

The ideal relation between the depth of the winding and the external diameter of the core may be expressed as follows: $.4A<D<.9A$. Between these limits the complete inductance will have minimum capacity and minimum resistance for a given inductance value. In cases where it is desired to have the inductance resonant at some particular frequency, a higher distributed capacity can be secured by increasing the diameter of the core or by decreasing the number of turns on the coil. On the other hand, if extremely low distributed capacity is desired, at the expense of a slight increase in resistance, this result may be secured by decreasing the length of the coil and increasing the number of turns on the coil.

The core 2 in Fig. 2 is shown as being tubular. Theory indicates and experiment proves that the central portion of a solid core has only a very slight effect in increasing the apparent permeability. By making the core tubular, a smaller amount of magnetic material is required and the completed inductance is provided with a convenient hole for ready mounting upon any suitable rod or stud which, however, should be of insulating material. The ideal relation between the wall thickness of the core and the external diameter of the core may be expressed as follows: $.2A<E<.4A$. Increasing the wall thickness of the core over the proportions above stated, gives only a very slight increase in apparent permeability.

with a disproportionate increase in losses. Decreasing the wall thickness of the core beyond the proportions above given, however, materially decreases the apparent permeability of the core without giving a proportionate decrease in the losses.

As an example of a high-frequency inductance designed in accordance with the proportions above stated, and embodying our invention, the following data are given:

| | | |
|---|---|---|
| Frequency | kilocycles | 456 |
| Inductance | microhenries | 1,500 |
| Resistance | ohms | 27 |
| Capacity | micromicrofarads | 2.9 |
| Reactance to resistance ratio, $Q=\omega L/R$ | | 160 |
| External diameter of core | inch | .375 |
| Length of core | do | .500 |
| Wall thickness of core | do | .087 |
| Length of winding | do | .120 |
| Depth of winding | do | .292 |
| Number of turns | | 240 |
| Conductor: | | |
| Number of strands | | 7 |
| Size of strands | | No. 41 enameled |
| Insulation over strands | | Single silk |
| Winding: | | |
| Space between turn | | None |
| Throw (times across and back per turn) | | 1 |

As will be apparent from the discussion above given, the presence of the iron core materially alters the distribution of the magnetic field around the coil. If the core were not present, or if it were only of the same length as the coil, the flux lines would lie much closer to the sides of the coil, thus increasing the eddy-current losses in the turns of the coil itself, and decreasing the effective inductance. The presence of a core of the proportions shown decreases the concentration of flux adjacent the turns of the coil and thereby tends to keep the losses due to the eddy currents in the turns of the coil at a minimum.

In order to make clear the advantage of designing the core in accordance with the proportions given, it may be pointed out that the same amount of magnetic material formed into a spool extending up both sides of the coil and through the central hole, although it might have the same apparent permeability as a core proportioned as above described, would very materially increase the losses and the high-frequency resistance of the coil. The resulting device would, therefore, have about the same inductance value but a much higher resistance value than a device constructed with the ideal proportions. Additionally, the presence of the iron close to a considerable number of the turns on the coil would materially increase the dielectric losses and thus still further increase the high-frequency resistance of the device.

It will be understood, as already explained, that departure may be made from any of the proportions herein stated and that inductances may be designed, utilizing the above relations, but departing from the proportion or the wire sizes and types above indicated, without departing from the scope of the present invention.

Figure 3:
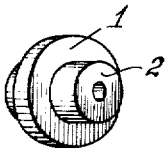
Fig. 3 is a view in perspective showing a high-frequency inductance embodying the invention and designed particularly for use in the upper high-frequency range.

Fig. 3 shows an inductance designed in accordance with the above principles and intended particularly for use in the upper high-frequency range, for example, the broadcast frequency range, the drawing being closely to scale. It will be noted that in this case a somewhat larger diameter of iron core has been used and that the radial depth of the winding is correspondingly decreased. It will be understood that a coil such as that shown in Fig. 3 represents an embodiment of the invention in which a deliberate departure from what may be regarded as the ideal proportions has been made, in order to favor the specific characteristics desired in a particular inductance.

Figure 4:
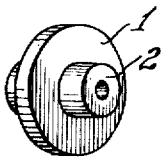
Fig. 4 is a view in perspective of another high-frequency inductance embodying the invention and designed particularly for use in the medium high-frequency range.

Fig. 4, similarly to Fig. 3, shows another embodiment of the invention, intended particularly for use in the medium high-frequency range, such for example as the frequencies commonly employed in the intermediate-frequency amplifiers of superheterodyne receivers. Here again deliberate departure from the proportions which may be regarded as ideal has been made, in order to favor specific characteristics of the inductance for this specific case.

Figure 5:
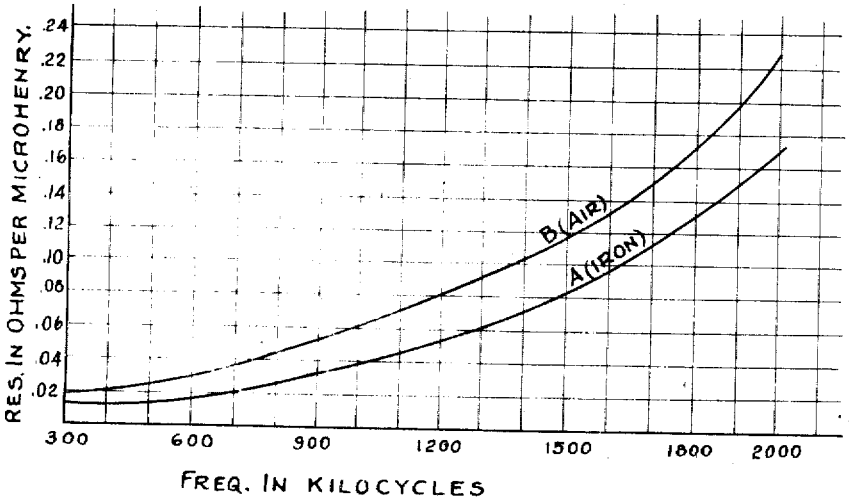
Fig. 5 is a graph showing the relation between the high-frequency resistance of inductances constructed in accordance with the invention, and frequency.

Curve A in Fig. 5 shows the resistance per unit of inductance (ohms per microhenry), over the frequency range from 300,000 to 2,000,000 cycles per second for an inductance designed in accordance with this invention. For comparison, curve B shows the resistance per unit of inductance for the same inductance without the iron core. The inductance without the core, in this case, was 148 microhenries, whereas with the core it was 254 microhenries, an increase of 70%. As will be seen from these curves, the resistance, in ohms per microhenry, even at the highest frequency, namely, 2,000,000 cycles per second, was 26% lower for the iron-core inductance.

Windings of the type described in this specification are multi-layer windings, and in accordance with the proportions given will have at least twice as many layers as turns per layer. The cores are preferably of circular cross section as shown, but may be of polygonal cross section, and will produce inductances departing from the proportions given to an extent depending upon how greatly the section of the core departs from a circle. The coil may be mounted otherwise than centrally of the core, the resulting inductance departing from the proportions given to an extent depending upon the eccentricity. These and other variations from the proportions indicated may be made without departing from the scope of the present invention.

In preferred embodiments of the invention, the coil is secured centrally of the core with any suitable adhesive, and the assembled high-frequency inductance is then given a flash dip of any suitable water-resistant wax to exclude moisture, and to protect the winding from mechanical damage. The inductance may be mounted upon any suitable insulating post or pin, but metallic mountings should be avoided, since they inevitably increase the losses, and the apparent resistance of the inductance, and may also operate to increase its capacity. The ends of the winding may conveniently be used as leads for making electrical connections to the inductance, but suitable terminals are preferably provided near the inductance, so that the relatively small wire will not extend unsupported for more than a short distance.

Having thus described our invention, what we claim is:

1. A high-frequency inductance device comprising a single pancake winding having an external diameter of approximately one inch and a low-loss open type cylindrical core of compressed comminuted magnetic material disposed within said winding, said winding being mounted concentrically upon said core and spaced therefrom to provide insulation of the order of 0.002 inch; said core being of such nature that the losses which it introduces are materially less in amount than the difference between losses arising in said winding and the larger losses which would arise because of more wire and insulating material in the winding of an inductance of equal value but having no magnetic core, the axial length of said winding being not less than three-eighths and not more than two-thirds of the radial depth of said winding, the length of said core being not less than three-quarters and not more than one and one-half times the diameter of said core, and the radial depth of said winding being not less than four tenths and not more than nine-tenths of the diameter of said core, whereby a higher ratio of desired inductance to undesired dissipative losses and an inductance which may be enclosed in a small shield may be secured than with a comparable inductance of a type having no magnetic core.

2. A high-frequency inductance device comprising a single pancake winding having an external diameter of approximately one inch and a low-loss open type tubular core of compressed comminuted magnetic material disposed within said winding, said winding being concentrically mounted upon said core and spaced therefrom to provide insulation of the order of 0.002 inch, said core being of such nature that the losses which it introduces are materially less in amount than the difference between losses arising in said winding and the larger losses which would arise because of more wire and insulating material in the winding of an inductance of equal value but having no magnetic core, the axial length of said winding being not less than than three-eighths and not more than two-thirds of the radial depth of said winding, the length of said core being not less than three-quarters and not more than one and one-half times the external diameter of said core, the thickness of the wall of said core being not less than two-tenths and not more than four-tenths of the diameter of said core, and the radial depth of said winding being not less than four-tenths and not more than nine-tenths of the diameter of said core, whereby a higher ratio of desired inductance to undesired dissipative losses and an inductance which may be enclosed in a smaller shield may be secured than with a comparable inductance of a type having no magnetic core.

3. A high-frequency inductance device comprising a single pancake winding having an expoiternal diameter of approximately one inch and a low-loss open type cylindrical core of compressed comminuted magnetic material disposed within said winding, said winding being mounted concentrically upon said core and spaced therefrom to provide insulation of the order of 0.002 inch, said core being of such nature that the losses which it introduces are materially less in amount than the difference between losses arising in said winding and the larger losses which would arise because of more wire and insulating material in the winding of an inductance of equal value but having no magnetic core, the axial length of said winding being not less than three-eighths nor more than two-thirds of the radial depth of said winding, the length of said core being not less than three-quarters and not more than one and one-half times the diameter of said core, the radial depth of said winding being not less than four tenths and not more than nine-tenths of the diameter of said core, said core diameter being of the order of three-eighths of an inch, whereby a higher ratio of desired inductance to undesired dissipative losses and an inductance which may be enclosed in a smaller shield may be secured than with a comparable inductance of a type having no magnetic core.

ALFRED CROSSLEY.
CHARLES C. NEIGHBORS.

CERTIFICATE OF CORRECTION.

Reissue No. 21,074. May 9, 1939.

ALFRED CROSSLEY, ET AL.

It is hereby certified that error appears in the printed specification of the above numbered patent requiring correction as follows: Page 3, first column, line 15, for "to" read of; page 6, first column, line 18, claim 1, for the word "small" read smaller; line 36, claim 2, for "than than" read than; same page, second column, line 12-13, claim 3, for "expoiternal" read external; and that the said Letters Patent should be read with this correction therein that the same may conform to the record of the case in the Patent Office.

Signed and sealed this 13th day of June, A. D. 1939.

(Seal)

Henry Van Arsdale
Acting Commissioner of Patents.